(12) United States Patent
Maes et al.

(10) Patent No.: US 9,851,253 B2
(45) Date of Patent: Dec. 26, 2017

(54) INFRARED THERMAL SENSOR WITH GOOD SNR

(71) Applicant: Melexis Technologies N.V., Tessenderlo (BE)

(72) Inventors: Ben Maes, Lommel (BE); Carl Van Buggenhout, Aalst (BE); Appolonius Jacobus Van Der Wiel, Duisburg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 453 days.

(21) Appl. No.: 14/571,562

(22) Filed: Dec. 16, 2014

(65) Prior Publication Data

US 2015/0177069 A1 Jun. 25, 2015

(30) Foreign Application Priority Data

Dec. 22, 2013 (GB) .................................. 1322829.1

(51) Int. Cl.
*G01J 5/02* (2006.01)
*G01J 5/12* (2006.01)

(52) U.S. Cl.
CPC ............. *G01J 5/0225* (2013.01); *G01J 5/023* (2013.01); *G01J 5/024* (2013.01); *G01J 5/12* (2013.01); *Y10T 29/49002* (2015.01)

(58) Field of Classification Search
CPC .......... G01J 5/0225; G01J 5/023; G01J 5/024; G01J 5/12; Y10T 49/49002

(Continued)

(56) References Cited

U.S. PATENT DOCUMENTS

| 5,777,329 A | * | 7/1998 | Westphal ................. G01J 5/20 250/339.02 |
| 6,163,061 A | * | 12/2000 | Iida .......................... G01J 5/20 257/414 |

(Continued)

FOREIGN PATENT DOCUMENTS

| EP | 0 354 369 A2 | 2/1990 |
| EP | 2 348 294 A1 | 7/2011 |

(Continued)

OTHER PUBLICATIONS

Extended European Search Report from EP Application No. 14197833.8, dated May 18, 2015.

(Continued)

*Primary Examiner* — Lisa Caputo
*Assistant Examiner* — Philip Cotey
(74) *Attorney, Agent, or Firm* — Justin J. Cassell; Workman Nydegger

(57) ABSTRACT

An infrared thermal sensor for detecting infrared radiation, comprising a substrate and a cap structure together forming a sealed cavity, the cavity comprising a gas at a predefined pressure; a membrane arranged in said cavity for receiving infrared radiation; a plurality of beams for suspending the membrane; a plurality of thermocouples for measuring a temperature difference between the membrane and the substrate; wherein the ratio of the thermal resistance between the membrane and the substrate through the thermocouples, and the thermal resistance between the membrane and the substrate through the beams and through the gas is a value in the range of 0.8 to 1.2. A method of designing such a sensor, and a method of producing such a sensor is also disclosed.

18 Claims, 9 Drawing Sheets

(58) Field of Classification Search
USPC ............................................................ 374/121
See application file for complete search history.

(56) References Cited

U.S. PATENT DOCUMENTS

| | | | | |
|---|---|---|---|---|
| 7,785,002 B2* | 8/2010 | Dewes | ................... | G01K 7/028 136/200 |
| 2002/0060291 A1* | 5/2002 | Morita | ..................... | G01J 5/02 250/338.1 |
| 2002/0172255 A1* | 11/2002 | Pannek | ................. | G01K 7/028 374/121 |
| 2006/0060786 A1* | 3/2006 | Vilain | ....................... | G01J 5/20 250/338.1 |
| 2007/0095380 A1* | 5/2007 | Dewes | ..................... | G01J 5/12 136/224 |
| 2007/0158570 A1* | 7/2007 | Ohta | ......................... | G01J 5/02 250/338.1 |
| 2007/0227575 A1* | 10/2007 | Kato | ......................... | G01J 5/12 136/224 |
| 2008/0130710 A1* | 6/2008 | Dewes | ..................... | G01K 7/028 374/179 |
| 2008/0216883 A1* | 9/2008 | Leneke | ..................... | G01J 5/06 136/224 |
| 2008/0317087 A1* | 12/2008 | Kimura | ..................... | G01J 5/16 374/1 |
| 2010/0258726 A1* | 10/2010 | Zhang | ........................ | G01J 5/02 250/336.1 |
| 2011/0147869 A1* | 6/2011 | Lazarov | ..................... | G01J 5/02 257/432 |
| 2011/0174978 A1* | 7/2011 | Forg | ........................... | G01J 5/02 250/338.3 |
| 2014/0326883 A1* | 11/2014 | Abdolvand | ............. | G01J 5/022 250/338.1 |
| 2015/0177070 A1* | 6/2015 | Maes | ....................... | G01J 5/023 374/121 |

FOREIGN PATENT DOCUMENTS

| | | |
|---|---|---|
| GB | 2 154 367 A | 9/1985 |
| JP | 2006-023216 A | 1/2006 |
| WO | 2005/034248 A1 | 4/2005 |
| WO | 2012/082801 A2 | 6/2012 |

OTHER PUBLICATIONS

Great Britain Search Report from Great Britain Application No. GB 1322829.1, dated May 15, 2014.

* cited by examiner

INFRARED THERMAL SENSOR WITH GOOD SNR

FIELD OF THE INVENTION

The invention relates to the field of thermal infra-red sensors, more in particular to an infrared thermal sensor comprising a membrane suspended in a cavity by means of a plurality of beams.

BACKGROUND OF THE INVENTION

Thermal infrared sensors (also known as "infrared thermal pixels", although this term is typically only used when an array of sensors is used) comprising a membrane (also known as "diaphragm") suspended in a cavity by means of a plurality of beams (also known as "webs") and having thermocouples arranged on said beams with one end located on the membrane and another end located on the substrate (also known as "bulk"), are known in the art.

The membrane is typically chosen as large as possible for maximizing infrared light reception, the beams must be mechanically sufficiently strong for carrying the membrane, and are typically chosen as long and as small as possible for minimizing heat loss from the membrane through the beams towards the substrate.

The working principle is as follows: an external object (or subject) emits IR radiation, which typically enters the cavity via a window or aperture in the package, and warms up the membrane, causing a temperature difference $\Delta T$ above the bulk temperature, which temperature difference is measured by means of a thermopile, i.e. a plurality of thermocouples connected in series. The thermopile provides a voltage indicative of the temperature difference.

Several different designs are described in the prior art. They can roughly be divided in two groups: a first group where the pressure in the cavity is "high-vacuum" (e.g. less than 100 mPa), and a second group where the pressure in the cavity is much higher, often referred to as "not high-vacuum" or "low vacuum", typically having a pressure higher than 100 Pa (1 mbar). High vacuum devices typically provide larger signals, but require a more expensive sealing technique.

US2011/0174978 describes a thermal infrared sensor, some embodiments of which are replicated in this document as FIG. 1(a) to FIG. 1(d), illustrating some examples of thermal infrared sensors available on the market. Although several designs are shown for obtaining a good performance of the thermal sensor, further optimization still seems possible.

In view of the importance for thermal infrared sensors for having good detectability, there is still room for improvement.

SUMMARY OF THE INVENTION

It is an object of embodiments of the present invention to provide an infrared thermal pixel with a good performance, in particular in terms of signal-to-noise ratio.

This objective is accomplished by a method and device according to embodiments of the present invention.

The present invention relates to an infrared thermal sensor for detecting infrared radiation, the infrared thermal sensor comprising a substrate and a cap structure together forming a sealed cavity, the cavity comprising a gas composition at a predefined pressure, a membrane arranged in said cavity for receiving infrared radiation (IR) through a window or aperture, a plurality of beams for suspending the membrane, a plurality of thermocouples arranged on said plurality of beams for measuring a temperature difference ($\Delta T$) between the membrane and the substrate due to incident infrared radiation, wherein the ratio of the thermal resistance (RT1) between the membrane and the substrate through the thermocouples, and the thermal resistance (RT2) between the membrane and the substrate through the beams and through the gas composition is a value in the range of 0.8 to 1.2. In preferred embodiment, the ratio of RT1/RT2 is in the range of 0.9 to 1.1, or even in the range of 0.95 to 1.05. It is an advantage of embodiments of the present invention that by taking into account the above defined relation based on material properties (e.g. thermal conductivity of the beam material and of the thermocouple materials and of the gas composition and its thermal conductivity, etc) and device properties (e.g. size and geometry of the cavity and of the membrane, the pressure, the size and geometry and location of the beams) an optimum, or close-to-optimum signal to noise ratio for the IR thermal sensor can be obtained.

Said ratio RT1/RT2 can also be expressed as the ratio of the amount of heat flowing through the thermocouples from the membrane to the substrate on the one hand, and the heat flow from the membrane to the substrate in all other ways on the other hand, when the sensor is in use. The latter comprises a.o. heat conduction through the beams (excluding the thermocouple material), radiation from the membrane surface, conduction and convection through the gas medium in the cavity.

The above condition expresses that improvement or optimization can be performed by taking the condition into account. For example, when certain parameters of the sensor are fixed, e.g. the cavity size and geometry, and the membrane size and geometry, and the pressure and gas composition inside the cavity, other parameters (e.g. the number and geometry of the beams) can be tuned towards an improved or optimum achievable SNR for a sensor with those fixed parameters. It was found that, once a close-to-optimum set of those other parameters was found, slight deviations around the optimum set, only slightly influence the SNR. This means that it is possible to obtain a very good SNR, e.g. a close-to-optimum SNR, even when RT1 is not exactly equal to RT2, but the ratio RT1/RT2 is close to 100%. The latter also leaves room for further optimizing other parameters not contributing to an optimized SNR while not largely losing the advantages obtained with respect to the improved SNR. Such embodiments are also envisaged in the present invention.

It is quite surprising that, although the above formula only directly relates to thermal resistances only, it provides an optimum in the electrical field, the reason probably being that the signal generation is typically based on a thermoelectric effect, e.g. the Seebeck-effect, and the noise, in particular the thermal noise, also called Johnson-noise, is also a thermo-electric effect.

It is pointed out that, for some given parameters, e.g. a circular membrane having a filling ratio of about 80% in a cavity, with a pressure below 100 mPa ("high vacuum"), and only two beams are allowed, that an optimum length & width of the beams may point to a solution which is not mechanically sufficiently stable. In such a case, the optimum SNR cannot be reached, and the length & width of the beams is determined by the mechanical constraints. The skilled person is however quite aware of what is mechanically feasible, and what is not. However, for all cases where mechanical considerations are not the limiting factor, the above condition can be used as a design rules or at least as a rule of thumb for implementing or improving the beam & thermocouple-structure of an infrared thermal sensor. Similarly, the geometry of the beams determined must be considered in view of what can be processed. Again, the skilled person is aware of what is feasible and the obtained results need to be evaluated in that perspective. Optimization therefore may take into account feasibility with respect to mechanical stability and processing possibilities.

At least the number and geometry of the beams and the number and geometry of the thermocouples may be such that the ratio of the thermal resistance (RT1) between the membrane and the substrate through the thermocouples, and the thermal resistance (RT2) between the membrane and the substrate through the beams and through the gas composition is a value in the range of 0.7 to 1.3, for example in the range of 0.8 to 1.2.

It is an advantage of embodiments of the present invention that the number of beams and the geometry of the beams, and the number of thermocouples and the geometry of the thermocouples can be selected such that the defined relation based on material and device properties can be obtained.

In a preferred embodiment, selection can be performed for a ratio of RT1/RT2 is in the range of 0.9 to 1.1, or even in the range of 0.95 to 1.05. Many experiments have shown that, as the ratio of RT1/RT2 approaches the value of 1.00, the signal-to-noise ratio of the sensor increases towards a maximum obtainable SNR for a particular sensor structure. The formula RT1=RT2 can therefore e.g. be used to find a suitable, e.g. optimum set of beams and thermocouples for a given sensor structure (e.g. for a predefined cavity, membrane, pressure, and process). The formula RT1=RT2 can e.g. be used to fine-tune the dimensions of the thermocouples and beams of a given sensor towards the optimal value.

It was surprisingly found that the number and geometry of the beams resulting in such a relation does not correspond with conventional selection of the number and geometry of the beams.

The length and/or the width of the beams and/or the length and/or the width of the beams of the thermocouples may be such that the ratio of the thermal resistance (RT1) between the membrane and beams towards the substrate, and the thermal resistance (RT2) between the plurality of thermocouples and the substrate is a value in the range of 0.7 to 1.3, for example in the range of 0.8 to 1.2. In a preferred embodiment, selection can be performed for a ratio of RT1/RT2 is in the range of 0.9 to 1.1, or even in the range of 0.95 to 1.05.

The membrane may have a plurality of slits extending from a point inside the membrane to its circumference, the slits being arranged adjacent to the beams for increasing the beam length.

Each beam may be substantially linear, and being arranged between two parallel slits of the membrane, such that part of the beams is substantially surrounded by the membrane.

The beams may be oriented such that different beams are substantially not co-linear.

Each beam may comprise at least one thermocouple and at least two of the beams may have a different length (La, Lb) whereby each of the thermocouples may have a substantially same constant width (Wa, Wb) to length (La, Lb) ratio. By keeping the W/L of the thermocouples constant for all the beams, the thermal resistance measured between the membrane and the substrate is also substantially constant for each beam, and at the same time, the electrical resistance measured between the membrane and the substrate is substantially constant for each beam.

It was surprisingly found that at least for some embodiments the signal to noise ratio SNR of the measured signal, e.g. the voltage provided by a thermopile formed by the thermocouples, can be improved for a given design of an infrared thermal sensor having different beam lengths, by choosing W/L constant for all thermocouples. According to embodiments of the present invention, an improved design of the beams, taking into account their width over length ratio, thus can be found.

By choosing beams having thermocouples with a substantially constant W/L, i.e. that longer beams are wider, and shorter beams are narrower, each beam has substantially the same thermal resistance, so that each beam conducts substantially the same amount of heat from the membrane towards the substrate, when in use. This helps to keep the temperature difference over the membrane as large as possible, and the temperature difference over each thermocouple substantially constant. Hence each thermocouple provides substantially the same voltage signal, and a more reliable measurement can be obtained as the contribution of the different thermocouples to the overall measured signal is the same for each thermocouple. At the same time, thermocouples with a constant W/L provide a substantially constant electrical resistance for each thermocouple (and hence also for each beam). Since thermal noise (also known as "Johnson noise") is proportional to the square-root of electrical resistance, this means that each thermocouple contributes in the same manner to the total noise of the total signal.

The number of beams as well as their length and width may be chosen as function of one or more of the other parameters defining the infrared thermal sensor, such as for example: membrane size, pressure.

The filling factor of the membrane in the cavity may be less than 50%. The filling factor may be determined as the surface area spanned by the membrane compared to the maximum cross-sectional surface area present in the cavity. It is advantageous to have a low fill factor if one wants to optimize the field of view. Alternatively, the filling factor may be larger than 50%, because if there is no or little loss through gas or air, the membrane may "catch" more radiation rendering the sensor more sensitive. In some examples, The filling factor may e.g. be smaller than 40%, e.g. about 30%. A typical example is a circular infrared thermal sensor having a diameter of about 255 micron, located in a square cavity having a length size of about 400 micron, hence the filling ratio is (pi×R×R)/(W×W)=about 32%. Such a membrane offers an excellent field-of-view (FOV), provided the aperture used is large enough.

The pressure in the cavity may be in the range of 500 Pa to 20 kPa. According to embodiments of the present invention a good, e.g. optimum design of the beams, taking into account their width over length ratio, can be found for each pressure, also for sensors operating at lower vacuum. As the signal of the thermopile is relatively small and needs to be amplified, the SNR of the original signal is very important. The pressure range may be between 5 to 200 mbar, for example between 10 and 100 mbar (i.e. 1 kPa to 10 kPa). Such a pressure may e.g. occur when glass-frit wafer bonding is used as a technique for sealing the cap to the substrate. The main advantage of such a process is that it provides a high reliability and stable hermetical sealing while allowing to use a simpler (cheaper) process compared to metallic or eutectic layer procedures. Such techniques and resulting devices are very much suitable for volume markets such as consumer electronics and automotive. At a pressure of 5 mbar (500 Pa) or more, the membrane loses a considerable amount of heat through the beams and thermocouples (conduction) but also via the membrane surface (radiation and convection and conduction). The present invention is particularly interesting for these kind of devices.

The beams may form a straight connection between a side of the cavity and the membrane and the beams, e.g. those positioned at opposite sides of the membrane, may be not oriented co-linear. With straight connection is meant that the beam is substantially linear. By not orienting beams located which are located on opposite sides of the membrane, (e.g. beams located at 180° angular distance as seen from the membrane center) in a co-linear way, but by orienting them e.g. under an angle of e.g. 5° to 25° away from the center of the membrane, stress in the sensor can be reduced by allowing rotation of the membrane.

The membrane may be substantially circular in cross section in a plane parallel with the substrate. Using a circular membrane has the advantage of providing a uniform Field-Of-View. It also provides symmetry (thermally and mechanically), which may also improve the uniformity of the temperature over the membrane. In addition, a circular membrane is advantageous for under etching reasons.

The arrangement of the membrane and the beams and the thermocouples may be symmetric or rotation symmetric. It is an advantage of choosing a symmetric design, or a rotation-symmetric design, (e.g. over 90° or 180°), because it is easier to design and simulate, and because it may reduce the number of variables when trying to find an optimum, or near optimum solution. It may also help to increase the uniformity of the temperature on the membrane.

The present invention also relates to an infrared sensor system comprising at least one infrared thermal sensor as described above. An example of such a system is a mobile device or a portable device having such an infrared thermal sensor for measuring the temperature of an object. Examples of such mobile devices are for example PDA's, laptops, mobile phones, smart phones, etc.

The present invention furthermore relates to the use of an infrared thermal sensor as described above for sensing infrared radiation.

The present invention also relates to a method of designing an infrared thermal sensor, the method comprising
  defining an infrared thermal sensor comprising a substrate and a cap structure together forming a sealed cavity, a membrane arranged in the cavity for receiving infrared radiation (IR) through a window or aperture;
  determining a number and geometry of beams to be arranged between the substrate and the membrane for suspending the membrane, and determining a number and geometry of thermocouples to be arranged on said beams for measuring a temperature difference ($\Delta T$) between the membrane and the substrate, in such a way that the ratio of the thermal resistance (RT1) between the membrane and the substrate through the thermocouples, and the thermal resistance (RT2) between the membrane and the substrate through the beams and through the gas composition is a value in the range of 0.7 to 1.3, for example in the range of 0.8 to 1.2.

For example, step a) may comprise choosing a set of fixed parameters, for example: a cavity size of 400×400 micron, and a circular membrane with a diameter of 300 micron, the cavity being sealed by glass-frit bonding such that the gas medium in the cavity is air at a pressure of about 10 mbar, and the process being standard CMOS compatible, the substrate being silicon.

Step b) may be performed taking into account further criteria or sensor design preferences, such as for example but not limited to,
  always locate two thermocouple legs on top of each other,
  choose the width of the beam as small as possible but large enough to hold the thermocouple legs (e.g. by adding 1.5 micron on the outside of the beam, to protect the legs against etching damage, and to foresee a predetermined distance between multiple thermocouples, if present on the same beam)
  locating the beams near diagonals of the cavity, and direct them towards the center of the membrane (this sets or at least gives approximate values for the lengths of the beams)
  choose W/L=constant for all thermocouples.
  selecting the length of the beam equal to the length of each thermocouple.

By doing so, the number of variables for finding a good, an optimal, or "close-to-optimal" solution is drastically reduced, so that, even when the heat transfer of the membrane cannot be exactly predicted, the skilled person can find a "close-to-optimal" solution by simulating only a very limited number of test-cases, and/or by building a very limited number of samples. In particular embodiments, he may vary the number of beams, the number of thermocouples per beam (e.g. one per beam, or two per beam, or three per beam), and the parameter W/L, and check which design gives the best SNR, or a good SNR, taking into account also improvement of other parameters. Since the number of beams and thermocouples per beam are integers, and good or optimum values can be expected in a relatively small range, there is only parameter left which may be varied in a continuous manner, but in practice is varied stepwise. Thus, the number of variations to be evaluated (for a given membrane) may be quite limited. In fact, in practice, in a first iteration a coarse step may be used, to find the best or good candidates for the integer values, and to find rough estimates for the continuous parameters. In a second or further iteration (e.g. a second sample batch), a fine step may be used to find a good, optimal or close-to-optimal solution.

Determining a number and geometry of the beams and number and geometry of thermocouples may comprise
  choosing and/or varying one or more of the number and/or geometry of the beams and/or thermocouples;
  determining an effect of the variation on the ratio, and determining based thereon a selection of the number and/or geometry of the beams and/or thermocouples to be used in the design.

For example, starting from an existing design, which is built and evaluated, one or more parameters can be varied in order to test and/or prove some hypothesis, and based on the measurements, an improved parameter, e.g. an optimum or close-to-optimum parameter can be obtained for the given sensor.

The method also relates to computer program product, adapted for, when run on a computer, performing a method for designing as described above.

The present invention also relates to a method for manufacturing an infrared thermal sensor, comprising performing a method for designing an infrared thermal sensor as described above, and producing an infrared thermal sensor in agreement with the determined number and geometry of the beams and thermocouples.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1A:
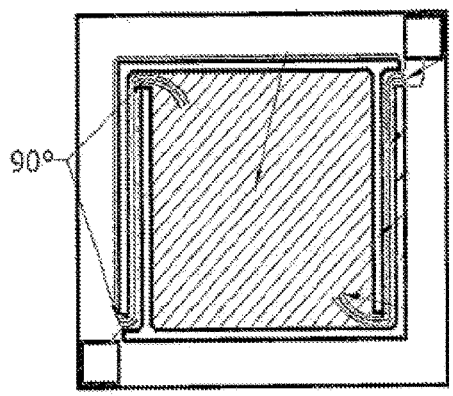
FIG. 1(a) to FIG. 1(d) show four embodiments of a prior art infrared thermal pixel, wherein a square membrane is suspended by two beams, and wherein the beam length is 1×, 2×, or 3× the length of the size of the membrane.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "high vacuum", reference is made to a pressure lower than 100 mPa.

In the present invention, the term "filling ratio" or "filling factor" can be determined as the surface area spanned by the membrane compared to the cross-sectional surface area present in the cavity (not taking into account the beams), as can be determined in a plane substantially parallel to the substrate. The cross-sectional surface area considered typically is the cross-sectional surface of the cavity in the plane where the membrane is suspended In the present invention, the unit of 1 bar corresponds to 10^5 Pa=100 000 Pa, and 1 mbar corresponds to 100 Pa.

In the present invention, wherein reference is made to the term "thermocouples", only the thermocouple legs is meant, e.g. the n type silicon and the p type silicon, but not the rest of the beam, e.g. silicon oxide, silicon nitride, even though the thermocouples are typically located on, or integrated in the beam.

In the present invention, where reference is made to the term "beam", sometimes the beam without the thermocouple material is meant (e.g. when discussing thermal aspects), sometimes the beam including the thermocouples is meant (e.g. when discussing geometrical or mechanical aspects). It will be clear from the context which meaning is intended. Sometimes the wording "beam(s) excluding thermocouple (s)" or "beam(s) including thermocouple(s)" is used to avoid confusion.

Figure 1B:
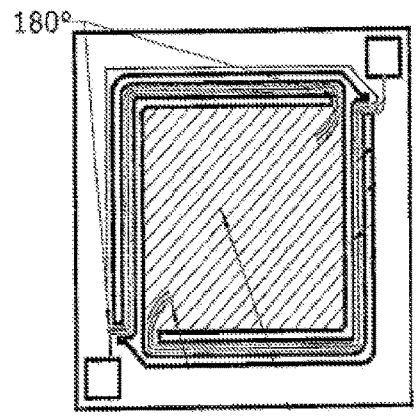
Figure 1C:
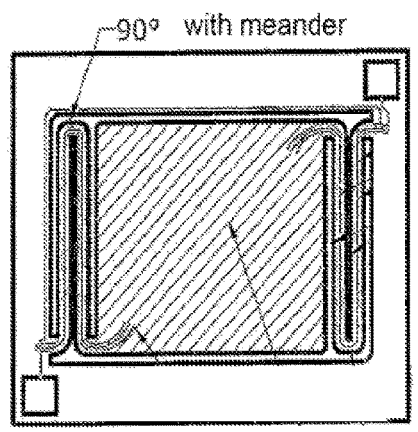
Figure 1D:
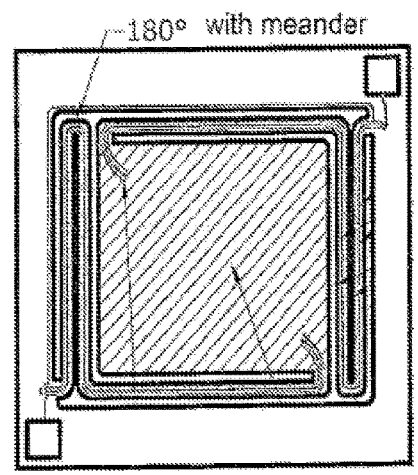

In order to illustrate the features and advantages of embodiments of the present invention, first some thermal infrared sensors are discussed known in prior art. FIG. 1(a) to FIG. 1(d) represent four embodiments of prior art infrared thermal pixels, all having a cavity with a square/rectangular circumference, a substantially square/rectangular membrane (in the middle) which is completely filling the space of the cavity except for the space taken by the beams and a small spacing on both sides of the beams. The membrane is suspended by two narrow beams, each carrying three thermocouples connected in series to form a thermopile. The beam length of the embodiment of FIG. 1(a) is substantially equal to 1× the length of the side of the membrane, and a small spacing is present on both sides of the beam. FIG. 1(b) shows a variant of the thermal pixel of FIG. 1(a) wherein the length of each beams is twice the length of the side of the membrane. FIG. 1(c) shows a variant of the pixel of FIG. 1(b) wherein the length of the beams is also twice the length of the side of the membrane, but wherein the beam is shaped as a meander. FIG. 1(d) shows yet another variant, whereby the length of the beams is 2× the width plus 1× the length of the membrane. Nevertheless, for the reader confronted with these different designs, it is not clear which length of the beams should be chosen for a good, optimal or close-to-optimal design.

The question of how the beams and thermocouples should ideally be designed to obtain an "good, optimal or close-to-optimal sensor" becomes even more difficult to answer for a sensor in which the membrane has an area substantially smaller than the cavity, e.g. having a filling ratio of 50% or less, and/or has a non-rectangular shape, e.g. a circular shape. This is a problem the inventors were confronted with.

Figure 2:
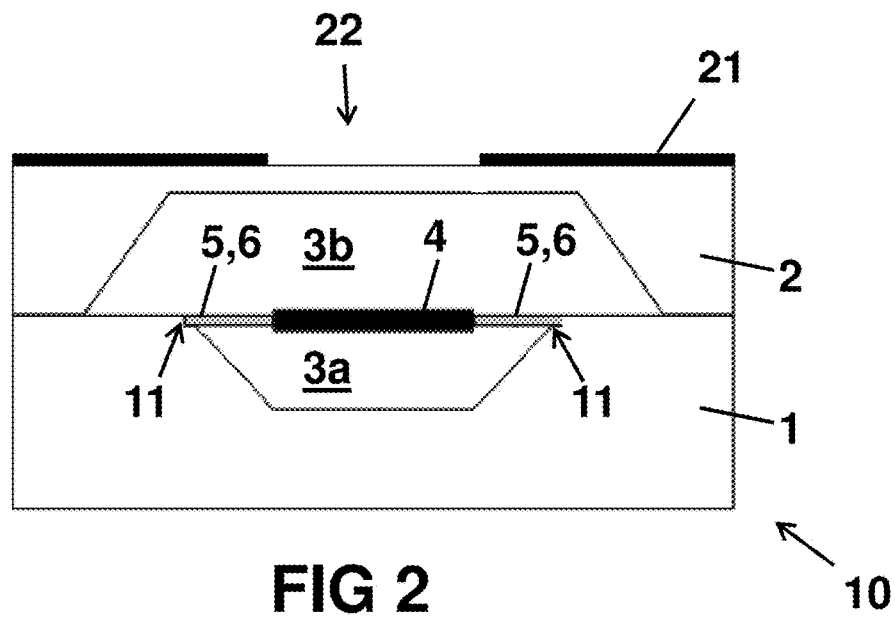
FIG. 2 is a schematic representation of an infrared thermal sensor with its main components, in cross section.

Before discussion the solutions proposed by the present invention, the basic structure of an exemplary thermal sensor 10 is explained with reference to FIG. 2. Whereas embodiments of the present invention are not strictly limited by all features in the exemplary thermal sensor, the principles of embodiments of the present invention can for example be easily applied to a thermal sensor as shown. FIG. 2 shows an infrared thermal pixel 10 comprising a substrate 1 (also called "bulk"), where a relatively thin structure 4, referred to as "diaphragm" or "membrane" 4 is formed, which is connected to the substrate 1 by means of so called "beams" 5 (also known as "webs"). The substrate material under the beams 5 and under the membrane 4 is preferably completely removed by means of known techniques, e.g. by etching techniques, leaving a cavity 3a underneath the membrane 4 and the beams 5. A cap structure 2, made of a material transparent to infrared (IR) light, and having a cavity 3b typically is placed above the membrane 4, and is sealed to the substrate 1, so that the membrane 4 and the beams 5 are encapsulated in a closed cavity 3 (combination of cavity 3a and 3b). The pressure "p" inside the cavity 3, and the gas composition inside the cavity 3 may be largely determined by the sealing technique used, but has an important impact on the design and performance of the infrared thermal sensor. In fact, two major sealing techniques are typically used for infrared thermal sensors: (1) metallic or eutectic layer bonding, providing a "high-vacuum" pressure in the cavity 3, or (2) glass-frit wafer bonding, resulting in a typical pressure of about 10 to 100 mbar (1 kPa to 10 kPa). Although "air" can be used as the gas composition, some prior art devices use a special gas having a low thermal conductivity, such as e.g. Krypton gas, for improving the performance. Most of the cap structure 2 is covered with a non-transparent material 21, except for an "opening" 22 (also known as "aperture" or "window") for allowing IR light to reach the membrane 4.

The size and/or shape of the membrane 4 can in principle be chosen for various reasons, for example: to absorb as much radiation as possible, not to lose too much heat through the air, the smaller the membrane the longer the beams, field of view. To improve or optimize the membrane for a certain field of view, the aperture 22 typically also is taken into account. The distance between the aperture 22 and the membrane 4 has also an influence. When this distance is higher, the aperture 22 and the membrane 4 can be larger for the same field of view. However, for the present invention it is assumed that the cavity 3 (and aperture 22 and pressure and gas composition) and the membrane 4 (size and shape) are predetermined, and that only the beams 5 and the thermocouples 6 can be determined. The task of the inventors is thus to find a suitable, e.g. most suitable set of beams and thermocouples.

Figure 3:
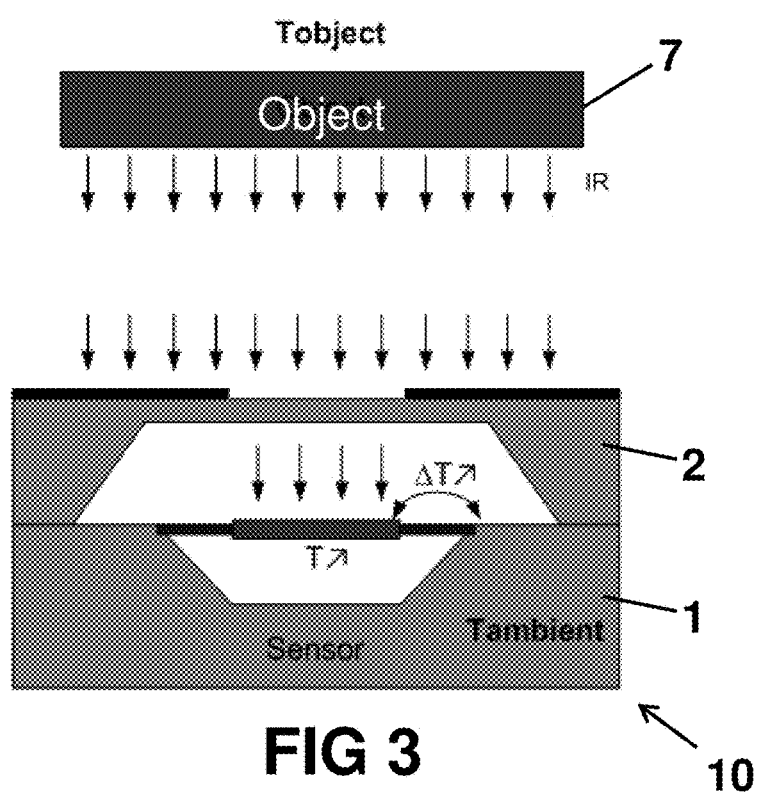
FIG. 3 illustrates how an external object (or subject) sends IR radiation through a window or aperture towards the membrane, which warms up.

FIG. 3 shows the exemplary IR thermal sensor of FIG. 2 and an external object 7 which is to be detected or for which its temperature $T_{object}$ is to be determined. Every object with a temperature higher than 0 Kelvin will radiate infrared (IR)

radiation. Depending on the temperature of the object ($T_{object}$), the amount of infrared radiation sent by the object 7 and received by the sensor 10 will vary. Therefore, by measuring the amount of radiation, and by determining the temperature of the substrate 1 using known techniques, the temperature of the object 7 can be determined. The infrared radiation IR is absorbed on a membrane 4 which is substantially thermally isolated from the bulk 1 by means of the cavity. The membrane 4 will heat up due to absorption of this IR radiation. The temperature difference may e.g. be in the order of 20 mK for an object having a temperature of about 60° C. in an environment of about 20° C. The infrared radiation typically is blocked from the surrounding bulk 1 by an aperture layer 21 so that the bulk material 1 will not heat up due to the infrared radiation. It is noted that the bulk material is very big compared to the dimensions of the membrane 4, and can be seen as a heat sink having a substantially constant temperature equal to the temperature of the environment. The substrate 1 can e.g. be silicon, or other suitable semiconductor materials.

If the object 7 is warmer than the environment of the sensor 10, there will be more IR radiation from the object 7 to the sensor than vice versa. This IR radiation will be absorbed by the membrane 4 and therefore the membrane 4 will (slightly) warm up. Because the temperature of the bulk 1 is substantially constant and equal to the ambient temperature, the temperature of the membrane 4 will increase by an amount of ΔT above the temperature of the substrate 1, which temperature difference ΔT can be measured, and is an indication of the IR radiation emitted by the object 7, which in turn is an indication of the temperature of the object 7.

Figure 4:
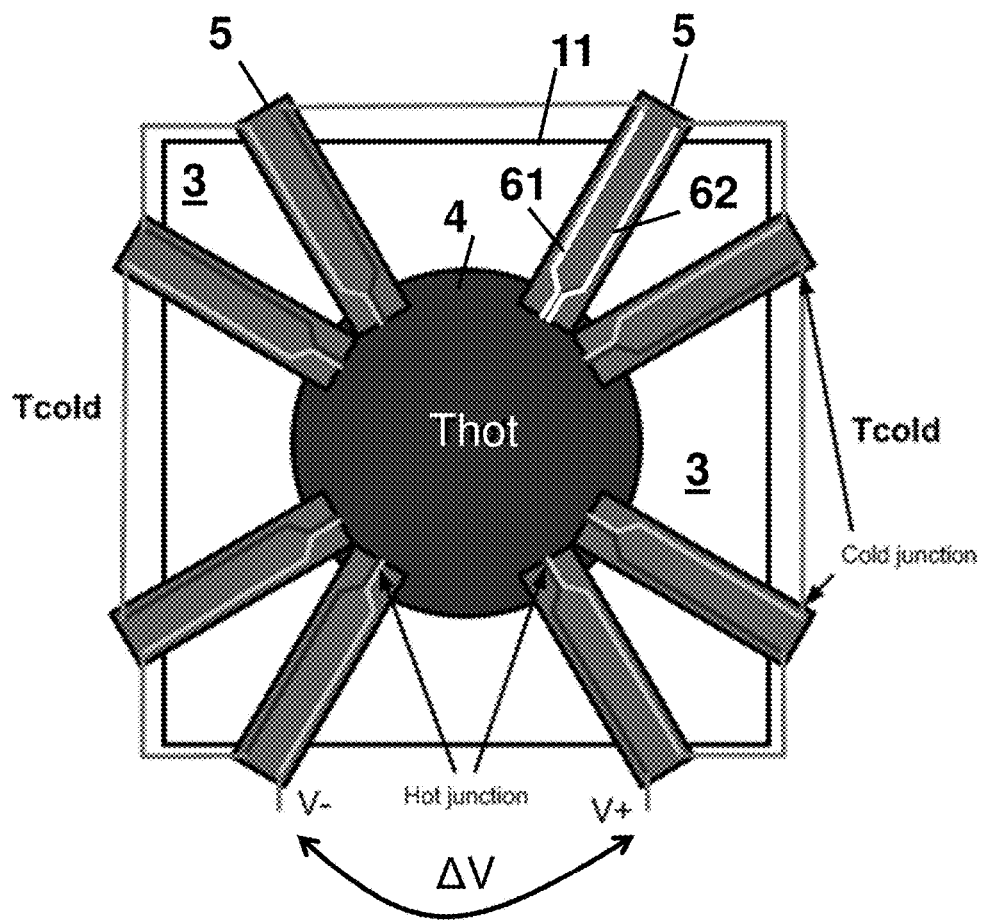
FIG. 4 shows how thermocouples located on the beams convert the temperature difference in a voltage signal.

Referring to FIG. 4, the temperature difference ΔT between the membrane 4 and the bulk 1 can be measured by placing thermocouples 6 between the membrane 4 and the bulk 1. As is well known in the art, a thermocouple 6 typically comprises or consists of two thermocouple-legs 61, 62 made of a different material, and will generate a voltage difference ΔV due to the Seebeck effect, which voltage difference ΔV is dependent on the temperature difference ΔT between the two nodes of the thermocouple, (and on the materials used for the thermocouple-legs, but the materials are predetermined), but is independent of the length and/or width of the thermocouple wires 61, 62, also known as "thermocouple legs" (assuming no current is flowing). The voltage ΔV generated by a single thermocouple is typically very small (order of micro-volts for a temperature difference ΔT of e.g. 40° C.).

The thermocouple legs 61, 62 may e.g. be constructed of n and p type poly-silicon. The voltage ΔV created by a single thermocouple 6 is then calculated in the following way:

$$\Delta V = \alpha * (T_{hot} - T_{cold})$$
$$\alpha = \pm cst * \ln\left(\frac{\rho}{\rho_0}\right)$$

where $T_{hot}$ is the temperature of the membrane 4, $T_{cold}$ is the temperature of the bulk 1, ρ is the thermal resistivity of the poly-silicon, ρ0 and cst are constant values, whereby the positive sign is selected for p type silicon and the negative sign is selected for n type silicon. By connecting the legs 61, 62 of a thermocouple 6 together, the voltage differences are summed. By connecting multiple thermocouples 6 in series (the series connection being known as a "thermopile"), a larger voltage difference is created.

It is noted that the thermocouples 6 also have a certain electrical resistance depending on the doping level. Placing all the thermocouples 6 in series will also place these electrical resistances in series. The total electrical resistance will therefore be the sum of the electrical resistances of each thermocouple 6. The thermal noise (also known as "Johnson noise") generated by the thermopile is proportional to the square-root of this total electrical resistance.

In general, where in embodiments of the present invention reference is made to the signal to noise ratio, reference is made to the ratio of the overall measured signal (e.g. voltage signal) with respect to the signal contribution not caused by the thermal signal to be measured but by electrical or thermal noise.

Although from the description above, it may at first sight seem clear (at least from an electrical point of view) how the total signal ΔV is generated, and how the total noise is generated, in practice it is not at all simple to design a good infrared thermal sensor 10, or to improve the SNR of an existing infrared thermal sensor 10, because, even if the cavity 3 (e.g. size and shape) and the pressure is fixed, the membrane 4 (e.g. size and shape) and the beams 5 (e.g. number, length, width) and the thermocouples 6 (number, length, width) influence the thermal behaviour of the membrane 4, and thereby also the temperature difference ΔT, which in turn has an impact on the voltage ΔV. It is therefore not at all easy to predict how a particular design-change of the beams will influence the SNR, because of the mutual interaction between the electrical, thermal, and (to a lesser degree) also the mechanical aspects of the beams 5.

In a first aspect, the present invention relates to an infrared thermal sensor for detecting infrared radiation. The infrared thermal sensor may comprises features and advantages of the exemplary system as described above, although embodiments are not limited thereto. According to embodiments of the present invention, the infrared thermal sensor comprises a substrate and a cap structure together forming a sealed cavity. The cavity comprises a gas composition at a predefined pressure. The sensor also comprises a membrane arranged in said cavity for receiving infrared radiation (IR) through a window or aperture. It further comprises a plurality of beams for suspending the membrane and a plurality of thermocouples arranged on said plurality of beams for measuring a temperature difference between the membrane and the substrate due to incident infrared radiation. According to embodiments of the present invention, the ratio of the thermal resistance (RT1) between the membrane and the substrate through the thermocouples, and the thermal resistance (RT2) between the membrane and the substrate through the beams and through the gas composition is a value in the range of 0.7 to 1.3, for example in the range of 0.8 to 1.2. In a preferred embodiment, selection can be performed for a ratio of RT1/RT2 is in the range of 0.9 to 1.1, or even in the range of 0.95 to 1.05.

By way of illustration, the invention not being limited thereto, standard and optional features of examples and/or exemplary embodiments of the present invention will further be described. In general, embodiments of the present invention may—where applicable—comprise one, more or all of the features described in the examples and/or exemplary embodiments.

Figure 5:
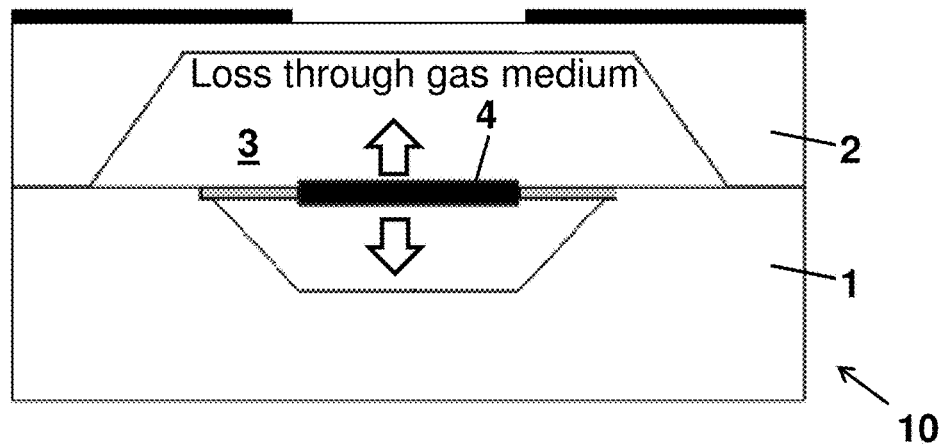
FIG. 5 is a schematic illustration of the heat loss from the membrane to the cap and to the substrate via the gas medium inside the cavity.

FIG. 5 schematic illustrates the principle of heat loss from the membrane 4 to the substrate 1 via the gas medium inside the cavity 3, when it has a temperature higher than the substrate 1. The heat loss towards the cap structure 2 is considered part of the heat loss towards the substrate 1. This heat loss is mainly caused by radiation, conduction and convection via the gas medium in the cavity. The amount of heat loss is mainly dependent on the area of the membrane 4 (the larger, the more dissipation), and the pressure and kind of the gas medium (the larger the pressure, the more dissipation), and the temperature difference between the membrane 4 and the substrate 1 (the larger the temperature difference, the more dissipation). In sensors with high vacuum, heat loss through the gas medium is negligible in comparison with the heat loss through the beams (including thermocouples) as will be described below. In sensors with a moderate pressure however, e.g. in the range of 1 mbar (100 Pa) to 10 mbar (1000 Pa), the heat lost via the membrane surface is considerable, and should be taken into account when designing a good, close-to-optimal or optimal sensor in terms of SNR.

Figure 6:
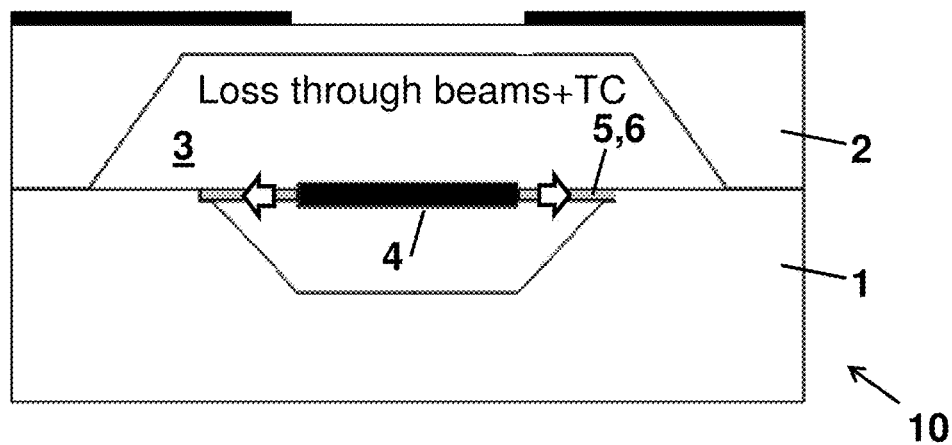
FIG. 6 is a schematic illustration of the heat loss from the membrane to the substrate via the beams and the thermocouples located thereon.

FIG. 6 schematic illustrates the heat loss from the membrane 4 to the substrate 1 via the beams 5 and the thermocouples 6. For sensors with "high vacuum", this is the main source of heat dissipation, and for this kind of sensors, the best results (in terms of SNR) are usually obtained by choosing the beams (with thermocouples) as long as possible, and as narrow as possible, so as to reduce the heat loss through the beams (with thermocouples) as much as possible. (It is noted that the word "narrow" is used, because the height of the beams is typically fixed by the process, e.g. for standard CMOS process, the height of the beams may be about 7 micron). These general guidelines however do not provide sufficient information for finding "the best" beams and/or thermocouples, in terms of a good, optimal or close-to-optimal signal to noise ratio.

Based on numerous experiments, measurements and simulations for finding a good, optimal or close-to-optimal set of beams and/or thermocouples, and based on the insights obtained from all these experiments, measurements and simulations, and based on theoretical considerations, it has been found that, for a given sensor, i.e. all parameters being fixed except the beams and thermocouples, good or even the best signal-to-noise (SNR) performance is obtained when the beams 5 and thermocouples 6 are chosen such that the amount of heat flowing through the thermocouples 6 from the membrane 4 to the substrate 1 is approximately equal to the heat flow from the membrane 1 to the substrate 1 in all other ways (i.e. not flowing through the thermocouple material). The latter comprises a.o. heat conduction through the beams excluding the thermocouple material, radiation from the membrane surface, conduction and convection through the gas medium in the cavity 3. It is specifically pointed out that, in contrast to what the prior art seems to suggest, the optimal SNR is not obtained by merely minimizing the heat loss through the beams 5 and thermocouples 6 (in the prior art usually considered as a single entity), but by deliberately designing the thermocouples and the beams such that the above mentioned condition is satisfied, or approached.

Figures 7, 8:
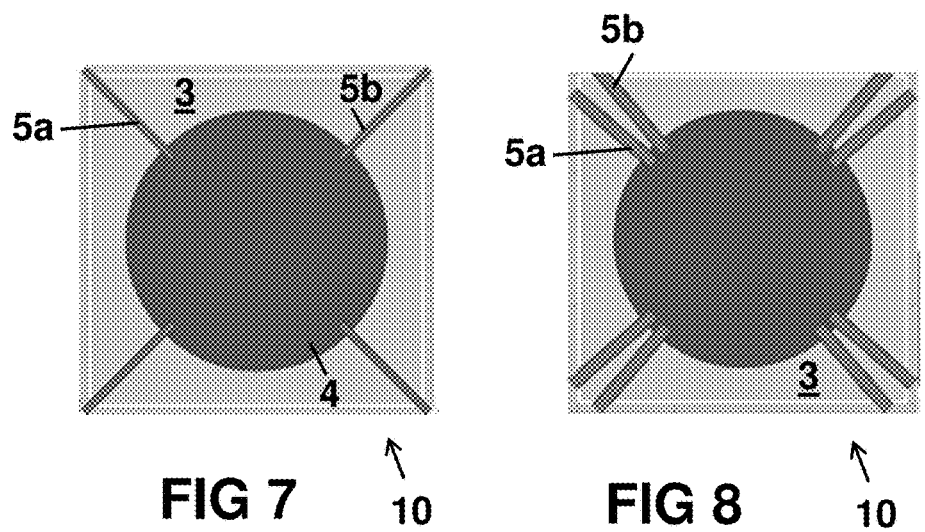
FIG. 7 is an example of an infrared thermal sensor having a square cavity and a circular membrane, and four beams located on the diagonals of the cavity.
FIG. 8 is an example of an infrared thermal sensor having a square cavity and a circular membrane, and four times two beams located on the diagonals of the cavity.

FIG. 7 is an example of an infrared thermal sensor 10 having a cavity 11 and a circular membrane 4, and four beams 5 located on the diagonals of the cavity, and directed towards the center of the membrane 4. This sensor works, but the beams 5 and thermocouples 6 do not provide the best SNR achievable for this structure (cavity, membrane, pressure). FIG. 8 shows one example of how the sensor of FIG. 7 can be improved. The improved sensor now has eight beams, and two thermocouples per beam. The beams were located close to the diagonal, their length thus being fixed by their location and orientation. The width of the thermocouples 6, and thus also the width of the beams they are located on, was fine-tuned towards its optimal value. In the simulations, the width of the beams was dependent on the width of the thermocouples, as will be explained with reference to FIG. 13(a). The height of the beams was fixed by the process to about 7 micron (for standard CMOS process), the thermocouple-legs are made of n type and p type silicon, and their height is fixed by the process to about 0.3 micron. Hence, once the number of thermocouples per beam was chosen, and the location of the beams was set, the only variable to be optimized was the width of the thermocouples. This width was selected such that the above mentioned equation was satisfied.

Figure 9:
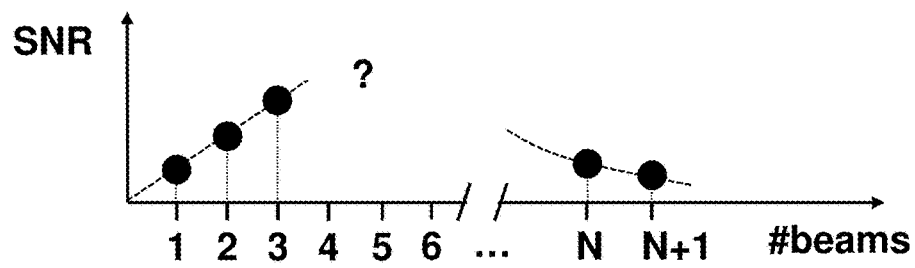
FIG. 9 is a schematic illustration of how the SNR of a first class of infrared thermal sensors typically varies in function of the number of beams (assumed to have a predefined length and width and one thermocouple per beam).

Without embodiments of the present invention being limited by theory, FIG. 9 provides a possible explanation of how the condition may result in an improved or optimum design. Reference thereby is made to the structure of FIG. 7. Two theoretical extremes first are considered Case 1 (small number of thermocouples): it is assumed that the thermal conduction of the air is dominant, that all the heat is lost through the air, and no heat is lost through the thermocouples. In this case, thermocouples can be added to the design without changing the temperature difference $\Delta T$ between the membrane and the silicon bulk. Since all the heat is lost through the air, adding or removing thermocouples will not change the temperature of the membrane. Thermocouples can be added as long as the thermal conduction of the air is dominant. From the moment that the thermal conduction through the air is not dominant anymore, the thermal conduction through the thermocouples will play a role and then this reasoning is not correct anymore. In that case, the temperature on the membrane will change when a thermocouple is added, since the thermal resistance from the membrane to the bulk is changed.

Case 2 (large number N of thermocouples): it is assumed that the thermal conduction of the thermocouples is now dominant, that all the heat is lost through the N thermocouples, and that the heat loss through the air is negligible. Since all the heat is conducted through the N thermocouples, the thermal resistance between the membrane and the bulk increases proportional with the number of removed thermocouples. The temperature therefore also increases proportional with the number of removed thermocouples. This reasoning is true as long as the thermal conduction is dominated by the beams. When the thermal conduction is not dominated by the beams anymore, removing beams will not decrease the temperature anymore, because some heat is conducting through the air.

Looking at case 1 and case 2 it can be understood that there is an optimum somewhere between these two extremes. One might think that the optimum is reached where the heat dissipation through the beams (here: beam material+thermocouple material) is equal to the heat dissipation through radiation and conductance and convection through the air, as suggested by FIG. 5 and FIG. 6, but the inventors have found that this is incorrect. All experiments seem to indicate that the true optimum SNR is obtained when the heat dissipation through the thermocouples (the thermocouples only, excluding the beam material) is approximately equal to the heat dissipation in all other ways (a.o. through the beam material itself, through radiation and through conduction and convection through the air). A possible explanation might be that the temperature difference over the thermocouple legs influences the signal and noise, while temperature difference over the beam material does not.

Figure 10:
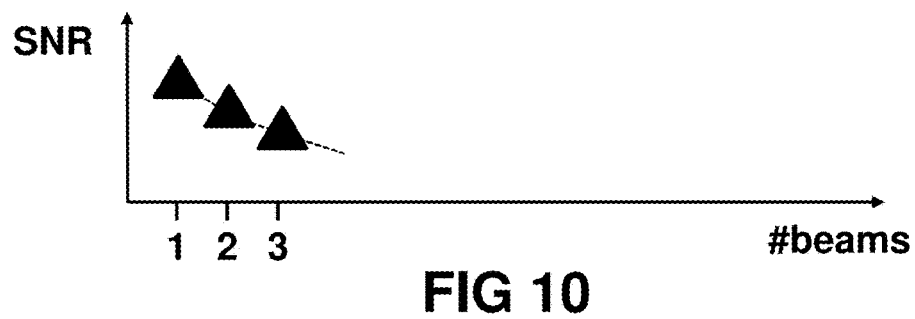
FIG. 10 is a schematic illustration of how the SNR of a second class of infrared thermal sensors typically varies in function of the number of beams (assumed to have a predefined length and width and one thermocouple per beam).

Although not the main focus of the present invention, FIG. 10 is added for completeness. It shows that for some structures (given cavity, membrane, pressure, . . . ) the optimum number of beams is only one. This is especially the case for sensors in "high vacuum". The theory mentioned above is in fact also applicable here, but for most sensors in high vacuum the beams would be so long and so narrow, that they would not provide sufficient mechanical rigidity, therefore, in practice, for this kind of devices, a set of beams is chosen which is mechanically sufficiently stable, and it is accepted that the SNR is sub-optimal.

In what follows, optimization is performed taking into account that good or optimal SNR is obtained when the ratio of the heat dissipation from the membrane to the substrate 1 through the thermocouples 6 is equal to the heat dissipation from the membrane to the substrate 1 in other ways. However, since heat is only flowing when the sensor is actually in use, this can be formulated also as follows: the optimal SNR lies where the thermal resistance RT1 between the membrane 4 and the substrate 1 through the thermocouples 6, is equal or substantially equal to the thermal resistance RT2 between the membrane 4 and the substrate 1 through the beams and through the air (or other gas composition in the cavity 2).

As mentioned above, the concepts of the present invention can be used to find a good, e.g. an optimum set of beams and thermocouples for a given cavity, membrane and pressure. It is pointed out however that this is in fact a multi-dimensional problem, and there is no single best solution known, but for a given set of additional constraints, a good or optimum set of beams and thermocouples (e.g. number and geometry) can be found.

One example was already described above, when describing the sensor of FIG. 8. In this case, the fixed set of parameters was: the cavity (size and geometry), the membrane (size and geometry), and the pressure inside the cavity. The addition set of constraints chosen by the designer was: the number of beams (eight), the number of thermocouples (two per beam, thus 16), the positions of the beams (close to the diagonals, as shown in the drawing) and thus the length of the beams and thermocouples, and the width of the beams as a function of the width of the thermocouples (e.g. as in FIG. 13(*a*), taking into account predefined values for the thickness $W_{ex}$ and for the interdistance $W_d$). The only parameter left to be optimized is than the width of the thermocouples $W_{tc}$, which can be found experimentally. It is noted that, should the designer use another set of constraints, he would find an "optimum" SNR for that other set of constraints. This shows again, that there is no single best solution (at least not known).

As one of the constraints (or further constraints), the designer may also set the maximum electrical resistance of the thermocouples 6.

Figure 11:
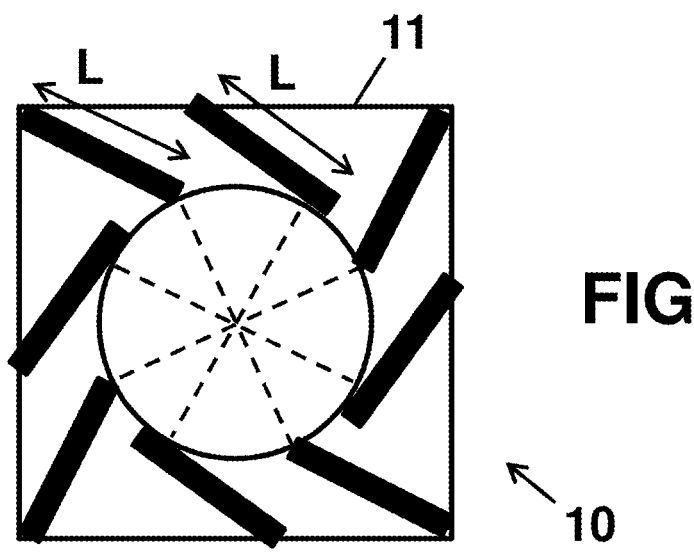
FIG. 11 illustrates an example of a possible rotation-symmetrical arrangement of eight beams between a circular membrane and a square cavity, all beams having the same length, width and number of thermocouples.

FIG. 11 illustrates an example of a possible arrangement of eight beams between a circular membrane 4 and a square cavity, all beams having the same length L, width $W_b$ and number $N_{tcpb}$ of thermocouples per beam. The designer can for example choose the length (length of beam $L_b$=length of thermocouple $L_{tc}$) and $N_{tcpb}$, and find the optimal thermocouple width $W_{tc}$. Or he may e.g. choose $W_{tc}$ and $N_{tcpb}$, and optimize for the optimal L that maximizes the SNR, for example by using finite elements, or by trial and error (making a number of test-structures, and measuring them, and select the best one).

Of course, each geometry has some further constraints, e.g. in this case the length L must be sufficiently large to span the distance between the corner of the cavity and the perimeter of the membrane, and there is also a maximum value for the length of the beam.

A particular advantage of the sensor of FIG. 11 is that the contact points on the membrane 4 are more uniformly distributed over the perimeter of the membrane 4 than was the case in the sensor of FIG. 8. This may help to obtain a substantially uniform temperature of the membrane, and may help to increase the temperature measured by the thermocouples, and thus increase the signal, and thus increase the SNR.

Another advantage of this structure is that the beams located at opposite sides of the membrane (at 180° angular position) are not co-linear, meaning that the imaginary lines they are located on do not pass through the center of the membrane. Such a structure allows the membrane 4 to slightly rotate in case of thermal stress. Another advantage of this arrangement is that it is rotation symmetric over an angle of 90°. This is beneficial for reducing the layout-efforts when making such a sensor, and/or when simulating such a sensor 10.

Figure 12:
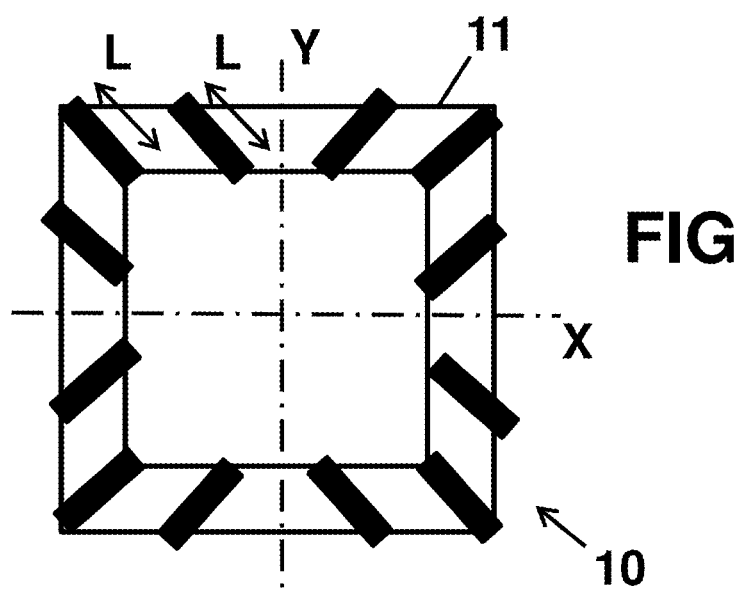
FIG. 12 illustrates an example of a possible symmetrical arrangement of twelve beams between a square membrane and a square cavity.

FIG. 12 illustrates an example of a possible symmetrical arrangement of twelve beams between a square membrane and a square cavity, all beams having the same length L, width $W_b$ and number $N_{tcpb}$ of thermocouples per beam. The designer can for example choose the length (length of beam $L_b$=length of thermocouple $L_{tc}$) and $N_{tcpb}$, and find the optimal thermocouple width $W_{tc}$. Or he may e.g. choose $W_{tc}$ and $N_{tcpb}$, and optimize for the optimal L that maximizes the SNR, for example by using finite elements, or by trial and error (making a number of test-structures, and measuring them, and select the best one).

Also this sensor has the advantage that the twelve contact points on the membrane 4 are uniformly distributed over the perimeter of the membrane 4. This may help to obtain a substantially uniform temperature of the membrane, and may help to increase the temperature measured by the thermocouples, and thus increase the signal, and thus increase the SNR. This sensor is also rotation-symmetric over an angle of 90°, but is also symmetric with respect to the axis X and Y shown in the drawing. This is beneficial for reducing the layout-efforts when making such a sensor, and/or when simulating such a sensor 10.

FIG. 13(*a*) to FIG. 13(*c*) shows several possible ways to arrange thermocouples on beams, however, the invention is not limited hereto, and other arrangements may also be used. These drawings are not drawn to scale. The beam of FIG. 13(*c*) has a single thermocouple 6 with two legs 61, 62 arranged next to each other. The beam has a width Wb1, and comprises an n type and p-type poly-silicon resistor 61, 62 to make the thermocouple 6, but there is also extra passivation 63, e.g. nitride and oxide placed around the poly-silicon. The width $W_{ex}$ of this passivation $W_{ex}$ is preferably chosen as small as possible for minimizing the thermal conductance of the beam, and may e.g. be chosen to be about 1.5 micron for avoiding etching of the thermocouples during the underetching of the membrane and the beams during production. In a standard CMOS process, a typical height of the thermocouple legs $H_{tc}$ is about 0.3 micron, and a typical height of the beam $H_{b1}$ is e.g. about 7 micron. The width of the thermocouple legs $W_{tc1}$ and $W_{tc2}$ is preferably equal, and can be chosen by design within a large range, e.g. in the range of 5 micron to about 50 micron, and even beyond this range.

As can be seen in FIG. 13(*b*), the two thermocouple legs 61, 62 may also be arranged on top of each other, in which case the width of the beam 5 can be reduced to a width $W_{b2}$ smaller than the width Wb1, assuming the same width $W_{tc}$ of the thermocouple legs. This is advantageous because in this way the total thermal resistance of the beam (excluding the thermocouples), which is substantially proportional to the cross section area of the beam, and inversely proportional to the length of the beam, can be increased. In view of the small thickness of the thermocouple legs (polysilicon layer), it is noted that the decrease in width $W_{b2}$ far outweighs the small increase in height $H_{b2}$.

Figure 13A:
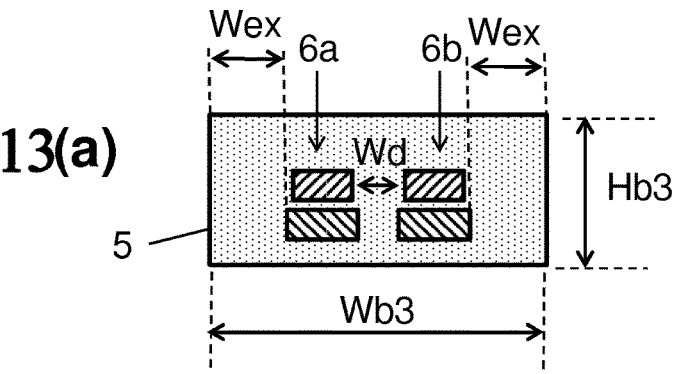
FIG. 13(a) to FIG. 13(c) shows several possible ways to arrange thermocouples on beams.

One can go one step further, as illustrated in FIG. 13(a) where two thermocouples 6a, 6b, each having two legs located on top of each other, are arranged on the same beam. As can be seen, by doing so, the beam width can be further reduced to a width $W_{b3}$ less than twice the width $W_{b2}$, and hence the total thermal resistance of the beam (excluding the thermocouples) can be further increased. Although not shown, it is also possible to place more than two thermocouples next to each other on the same beam, by adding another interdistance $W_d$ and thermocouple width $W_{tc}$.

From an electrical point of view, it should be mentioned that the beam material (e.g. comprising nitride and/or oxide) is an electrical insulator, hence the electrical resistance is only determined by the thermocouple legs 61, 62. Since the length and width and height of the thermocouple legs is substantially identical in each of FIG. 13(a) to FIG. 13(c), also the thermal noise generated by these thermocouples is substantially identical. For completeness, it is noted that the width of the upper thermocouple leg in FIG. 13(b) is in practice slightly smaller than that of the underlying thermocouple leg, due to processing constraints, but in this case the average width $W_{tc}$ of the thermocouple legs is taken as "the" thermocouple width.

Figure 13B:
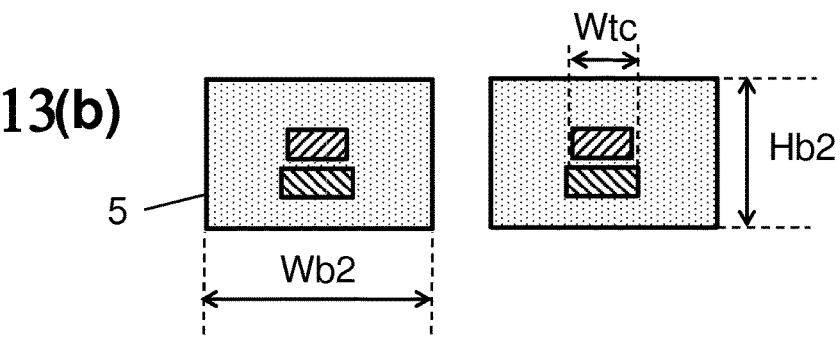
Figure 13C:
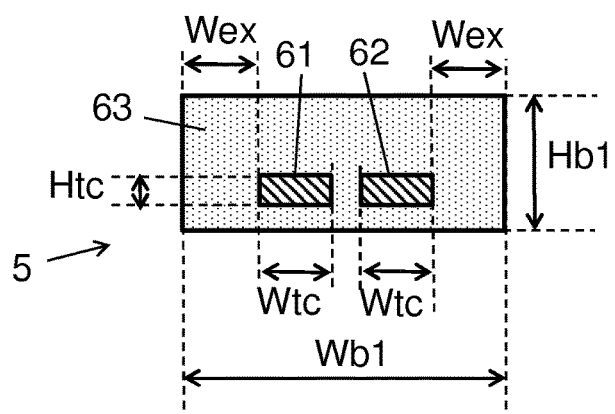

From a mechanical point of view, it should be mentioned that the beams have a typical height of 7 μm, while the thermocouple legs 61, 62 are typically only about 0.3 μm thick, hence the height $H_{b3}$ of the beam of FIG. 13(a) is identical to the height $H_{b2}$ of the beam of FIG. 13(b), which is typically slightly larger than the height $H_{b1}$ of the beam of FIG. 13(c). Since the width $W_{b3}$ of the beam of FIG. 13(a) is slightly smaller than twice the width $W_{b2}$ of the beams of FIG. 13(b), it is mechanically slightly weaker. Likewise, one beam of FIG. 13(b) is slightly weaker than the beam of FIG. 13(c). This may be taken into consideration of the mechanical aspects.

In designs where mechanical strength or rigidity is not a concern, it is therefore better to combine the thermocouples on a single beam, because such a beam would provide the highest thermal resistance for a given thermocouple width.

Figure 14:
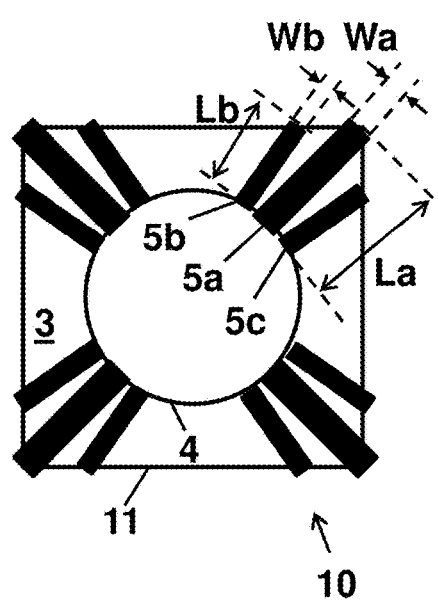
FIG. 14 shows a sensor similar to that of FIG. 7, but having twelve beams.

FIG. 14 shows a sensor similar to that of FIG. 7, but having twelve beams, three beams being arranged in each corner of the cavity. The inventors could have used as a criterion that all the thermocouples (and hence also the beams) have the same width, but they came to the idea of choosing a constant factor W/L for all the thermocouples, which means that the longer beams (in the middle of each set of three beams) is slightly broader than the other two beams. It turned out that, for a particular set of parameters (cavity, membrane, pressure, number of thermocouples per beam, etc) the optimum SNR of that structure is slightly higher than the optimum SNR of the same structure and parameters, except that the width of each thermocouple was kept constant.

The rationale behind the idea of choosing a constant W/L for each thermocouple was that by doing so, each beam has substantially the same thermal resistance, so that each beam conducts substantially the same amount of heat from the membrane towards the substrate, when in use. This helps to keep the temperature difference over the membrane as large as possible, and the temperature difference over each thermocouple substantially constant. Hence each thermocouple provides substantially the same voltage signal, and a more reliable measurement can be obtained as the contribution of the different thermocouples to the overall measured signal is the same for each thermocouple. At the same time, thermocouples with a constant W/L provide a substantially constant electrical resistance for each thermocouple (and hence also for each beam). Since thermal noise (also known as "Johnson noise") is proportional to the square-root of electrical resistance, this means that each thermocouple contributes in the same manner to the total noise of the total signal.

Figure 15:
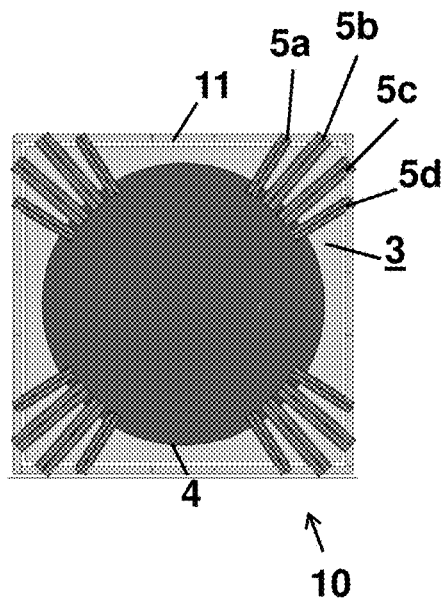
FIG. 15 shows a variant of the sensor of FIG. 14, having sixteen beams.

FIG. 15 shows a variant of the sensor of FIG. 14, but now having sixteen beams. As can be seen from the drawing, also here it was chosen as a design-criterium that W/L has to be constant for all the beams. It can indeed be seen that the width of the two longer beams 5b, 5c is higher than the width of the outer beams 5a, 5d of each set of four beams.

An optimum W/L and corresponding optimum SNR was searched (by simulation) for several configurations. For a structure with only 4 thermocouples (4 beams, each having 1 thermocouple, arrangement as shown in FIG. 7), the optimum W/L is 0.0112 and the corresponding optimum SNR is 12.14 dB. For a structure with 8 thermocouples (8 beams, each having 1 thermocouple, arrangement as shown in FIG. 8), the optimum W/L is 0.1071 and the corresponding optimum SNR is 20.99 dB. For 12 thermocouples (12 beams, each having 1 thermocouple, arrangement as shown in FIG. 14), the optimum W/L is 0.0500 and the corresponding optimum SNR is 22.39 dB. For 16 thermocouples (16 beams, each having 1 thermocouple, arrangement similar to that of FIG. 15) the optimum W/L is 0.0357 and the corresponding optimum SNR is 23.69 dB. For 32 thermocouples (16 beams each having 2 thermocouples, arrangement similar to that of FIG. 15) the optimum W/L is 0.1128 and the corresponding optimum SNR is 33.78 dB. For 64 thermocouples (16 beams, each having 4 thermocouples, arranged as shown in FIG. 15), the optimum W/L is 0.1062 and the corresponding optimum SNR is 34.50 dB.

This set of simulations show that there is an optimum beam & thermocouple arrangement for the sensor structure of FIG. 15 having the predefined parameters: cavity=400 um, membrane diameter=357 um, gas=air, pressure=10^5 Pa, and process=standard CMOS process, and as additional constraints: the beams are straight, and the location of the beams is near the diagonals, and the design is symmetric, and the number of beams is at most 16 beams (so that there are only two different widths to design & simulate, and also for facilitating full underetching).

The table 1 lists a set of parameters for of these "optimal designs" for a pressure of 1+10^5 Pa.

TABLE 1

|  | sensor of FIG. 15 |
|---|---|
| Sensor size | 400 um |
| Absorber diameter | 357 um |
| Number of beams | 16 |
| Number of thermocouples per beam | 2 |
| Extend thermocouples on membrane | 10 um |
| Extend thermocouples on bulk | 20 um |
| Width thickest beam (poly 2) | 8.9 um |
| Width thickest beam (poly 1) | 8.9 + 0.8 = 9.7 um |
| Width thickest beam (beam) | 2*(8.9 + 0.8) + 0.5 + 3 = 22.9 um |
| Width thinnest beam (poly 2) | 6.1 um |
| Width thinnest beam (poly 1) | 6.1 + 0.8 = 6.9 um |
| Width thinnest beam (beam) | 2 * (6.1 + 0.8) + 0.5 + 3 = 17.3 um |

In a variant of this sensor, the membrane was slightly larger, and as an additional criterion, the width of all the beams had to be the same. The optimal design parameters for this design, for a pressure of 1×10^5 Pa are listed in Table 2.

TABLE 2

| | |
|---|---|
| Sensor size | 400 um |
| Absorber diameter | 370 um |
| Number of beams | 16 |
| Number of thermocouples per beam | 2 |
| Extend thermocouples on membrane | 10 um |
| Extend thermocouples on bulk | 20 um |
| Width beam (poly 2) | 6.2 um |
| Width beam (poly 1) | 6.2 + 0.8 = 7 um |
| Width beam (beam) | 2*(6.2 + 0.8) + 0.5+ 3 = 17.5 um |

Figure 16:
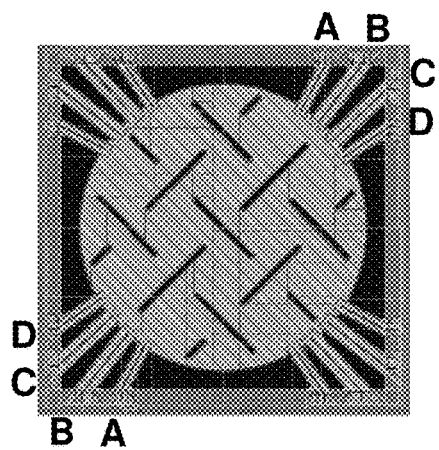
FIG. 16 shows the sensor of FIG. 15, the membrane having a plurality of slits for etching purposes.

FIG. 16 shows a variant of the sensor of FIG. 15, whereby the membrane 4 has a plurality of slits for etching purposes. The slits have an influence on the effective membrane area that can absorb infrared radiation, but also on the heat loss though the air. In order to find the "optimum" SNR, the slits therefore should be taken into account, because the influence the heat-equation.

The table 3 lists a set of parameters for an "optimal design". It is noted that the beams located on opposite sides of the membrane (e.g. the beams with label A) are not located on an imaginary line through the center. The imaginary lines are not drawn for not overloading the figure. The same applies to the imaginary lines of the beams B, and the beams C, and the beams D.

TABLE 3

| | Design 1 (W/L = constant) | Design 2 (W = constant) |
|---|---|---|
| Pressure (mbar) | 10 | 10 |
| Temp environment (K) | 300 | 300 |
| Temp measured object (K) | 360 | 360 |
| Sensor size (um) | 400*400 | 400*400 |
| Cavity depth under mem (um) | 120 | 120 |
| Cavity height above mem (um) | 125 | 125 |
| Membrane diameter (um) | 357 | 357 |
| Area_membrane_without_slits (um^2) | 99986 | 99986 |
| Area_slits | 10567 | 10567 |
| Area_slits/Area_membrane_without_slits | 0.1057 | 0.1057 |
| thermocouples | 32 | 32 |
| Length beams (um) | 83.8-56.4 | 83.8-56.4 |
| Width thermocouple (um) | 8.9-6.1 | 7.5 |
| Sensitivity (uV/K) | 19.024 | 18.487 |
| electrical_resistance (kOhm) | 84.054 | 83.889 |
| thermal_resistance_beams (m^2*K/W) | 11133 | 10763 |
| SNR (dB) | 54.2112 | 53.9711 |

The reason is the following: when the membrane heats up, it will extend (grow). Placing the beams in the manner shown makes sure that the membrane 4 does not pop up or down or break the structure. By orienting the beams in this way, it is possible for the membrane to have a certain torque with which it can take in the extra stress.

In the example shown, any thermal expansion of the beams results in a torque for turning the membrane in a clockwise position, however the invention is not limited thereto, and it is also possible to orient the beams so as to cause a torque in the counter-clockwise direction. The same reasoning also applies to the other embodiments of the present invention, where this feature is used.

Figure 17:
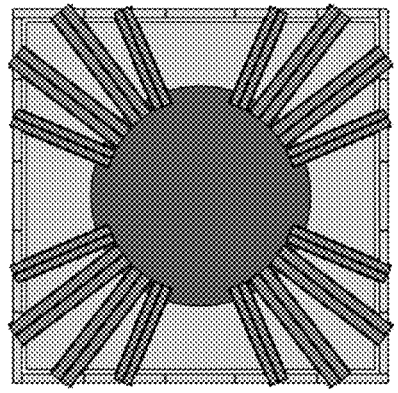
FIG. 17 shows a variant of the sensor of FIG. 15, where the membrane has a smaller diameter than that of FIG. 15.

FIG. 17 shows a variant of the sensor of FIG. 15, where the membrane has a smaller diameter than that of FIG. 15. One of the advantages of choosing a smaller diameter is that the beams become longer, hence the heat dissipation through the beams is reduced. At the same time, the heat dissipation from the membrane surface is reduced. From an electrical point of view, the thermocouples have become longer, but at the same time wider. In order to evaluate if the optimal SNR of this structure is better or worse than that of the structure of FIG. 15, the same method as explained above can be used.

Table 4 lists a set of parameters for an "optimal design" of the sensor of FIG. 17, for a pressure of 1×10^5 Pa.

TABLE 4

| | |
|---|---|
| Sensor size | 400 |
| Absorber diameter | 252 |
| Number of beams | 16 |
| Number of thermocouples per beam | 2 |
| Extend thermocouples on membrane | 10 |
| Extend thermocouples on bulk | 20 |
| Width thickest beam (poly 2) | 12 |
| Width thickest beam (poly 1) | 12 + 0.8 = 12.8 um |
| Width thickest beam (beam) | 2*(12 + 0.8) + 0.5 + 3 = 29.1 um |
| Width thinnest beam (poly 2) | 8.86 um |
| Width thinnest beam (poly 1) | 8.86 + 0.8= 9.66 um |
| Width thinnest beam (beam) | 2 * (8.86 + 0.8) + 0.5+ 3 + 21.22 um |
| SNR | 32.59 |

Figure 18:
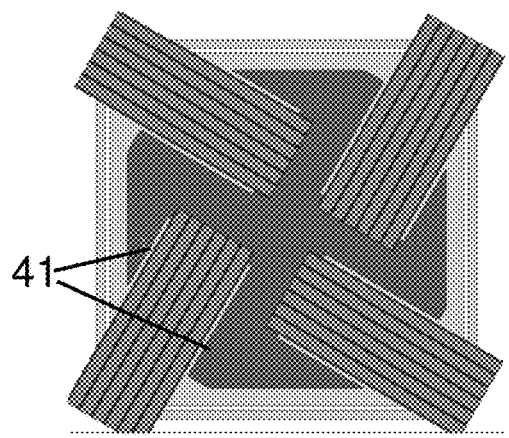
FIG. 18 shows a sensor with four beams, the membrane having parallel slits adjacent to the beams for increasing the beam length, according to aspects of the present invention.

FIG. 18 shows a sensor 10 with another structure. The sensor 10 has four beams; the membrane 4 has parallel slits 41 adjacent to the beams for increasing the beam length. At the same time, the slits are used for underetching, but instead of locating them somewhere on the membrane 4 far away from the thermocouples, they are deliberately located adjacent to the thermocouples (thus adjacent to the beams). Thus they perform a double function: to facilitate complete underetching of the beams and of the membrane, and to increase the length of the thermocouples, and thus increase the thermal resistance. In this way the loss in absorber area due to the slits is used to create a higher thermal resistance of the beams.

It is noted that the beams are also oriented slightly off-center, for reducing thermal stress, by allowing the membrane to slightly rotate around an axis perpendicular to the substrate.

In a variant of the sensor shown in FIG. 18, there could have been an additional slit in the middle of each beam, thereby effectively splitting the beams in two. The effect on the performance is expected to be very small, because the length and width etc. of the thermocouples would remain the same, although the effective membrane surface would slightly decrease. However, a major advantage would be that the under-etching under the beam would be much improved, especially in the corners of the cavity. Simulations showed that in this case, a design with 6 thermocouples per beam offered the best performance.

Table 5 shows the optimum parameters of a design according to FIG. 18.

TABLE 5

| | |
|---|---|
| Sensor size | 400 um |
| Absorber diameter | 400 um |
| Number of beams | 4 |
| Number of thermocouples per beam | 6 |
| Extend thermocouples on membrane | 10 um |
| Extend thermocouples on bulk | 20 um |
| Width thickest beam (poly 2) | 15 um |
| Width thickest beam (poly 1) | 15 + 0.8 = 15.8 um |
| Width thickest beam (beam) | 2*(15 + 0.8) + (5*0.5) + 3 = 100.3 um |
| SNR (dB) | 34.58 |

Figure 19:
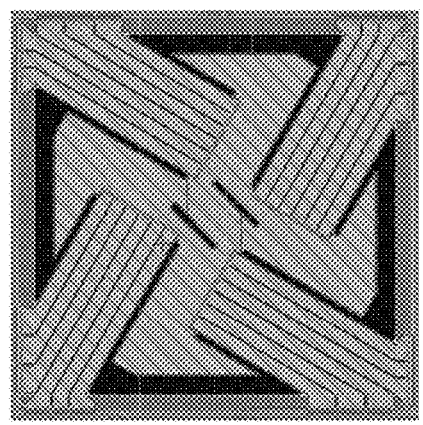
FIG. 19 shows an actual layout drawing of the sensor of FIG. 18, with two additional slits for etching purposes.

FIG. 19 shows the actual layout used for the sensor of FIG. 18. As can be seen, two additional slits were added near the center of the membrane for under-etching purposes.

Figure 20:
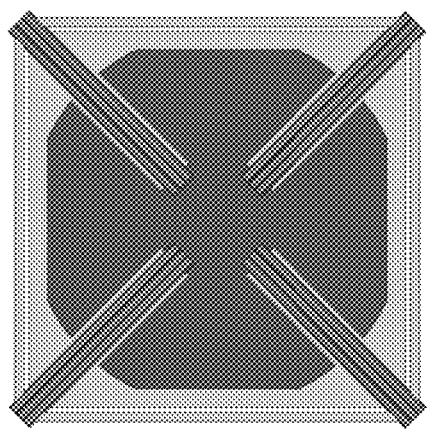
FIG. 20 shows a variant of the sensor of FIG. 18.

FIG. 20 shows a variant of the sensor of FIG. 18, where the same principle of the slits being located adjacent to the thermocouples is used, for making the beams longer, and for serving at the same time as etching slits, so that dedicated etching slits can be avoided. In this case however, the beams are oriented towards the center of the membrane. A similar sensor arrangement as indicated in FIGS. 18 to 20, without being optimized according to the first aspect of the present invention also is envisaged by the present invention.

In another aspect, the present invention relates to an infrared thermal sensor for detecting infrared radiation. The infrared thermal sensor comprises a substrate and a cap structure together forming a sealed cavity. The cavity comprises a gas composition at a predefined pressure. In the cavity, a membrane is arranged for receiving infrared radiation (IR) through a window or aperture. The sensor also comprises a plurality of beams for suspending the membrane and a plurality of thermocouples arranged on or in said plurality of beams for measuring a temperature difference ($\Delta T$) between the membrane and the substrate due to incident infrared radiation. An infrared thermal sensor (10) according to any of the previous claims, wherein the membrane (3) has a plurality of slits (41) extending from a point inside the membrane to its circumference, the slits being arranged adjacent to the beams (5) for increasing the beam length. According to embodiments of the present invention the beams are arranged such that part of the beams is substantially surrounded by the membrane or substantially embedded in the membrane. One or more, advantageously all of the beams may at least partially be separated from the membrane by slits in the membrane. One, more or all of the beams may be substantially linear. One, more or all of the beams may be arranged between two parallel slits in the membrane. In this way part of the beams is substantially surrounded by the membrane. The beams may be oriented such that different beams are substantially not co-linear.

In another aspect, the present invention thus also relates to the use of an infrared thermal sensor as described above for determining the temperature of an object.

In one aspect, the present invention also relates to an infrared sensor system. Such a system according to embodiments of the present invention comprises at least one infrared thermal sensor as described in the first aspect. Other features may be as those known by the person skilled in the art. An example of such a system is a mobile device or a portable device having such an infrared thermal sensor for measuring the temperature of an object. Examples of such mobile devices are for example PDA's, laptops, mobile phones, smart phones, etc.

The invention claimed is:

1. An infrared thermal sensor for detecting infrared radiation, the infrared thermal sensor comprising:
a substrate and a cap structure together forming a sealed cavity, the cavity comprising a gas composition at a predefined pressure;
a membrane arranged in said cavity for receiving infrared radiation through a window or aperture;
a plurality of beams for suspending the membrane;
a plurality of thermocouples arranged on said plurality of beams for measuring a temperature difference between the membrane and the substrate due to incident infrared radiation;
wherein the ratio of the thermal resistance between the membrane and the substrate through the thermocouples, and the thermal resistance between the membrane and the substrate through the beams and through the gas composition is a value in the range of 0.8 to 1.2, wherein a numerator of the ratio comprises the thermal resistance between the membrane and the substrate through the plurality of thermocouples, and a denominator of the ratio comprises the thermal resistance between the membrane and the substrate through the plurality of beams and through the gas composition.

2. An infrared thermal sensor according to claim 1, wherein at least the number and geometry of the beams and the number and geometry of the thermocouples are such that the ratio of the thermal resistance between the membrane and the substrate through the thermocouples, and the thermal resistance between the membrane and the substrate through the beams and through the gas composition is a value in the range of 0.8 to 1.2.

3. An infrared thermal sensor according to claim 2, wherein the length and/or the width of the beams and/or the length and/or the width of the beams of the thermocouples are such that the ratio of the thermal resistance between the membrane and beams towards the substrate, and the thermal resistance between the plurality of thermocouples and the substrate is a value in the range of 0.8 to 1.2.

4. An infrared thermal sensor according to claim 1, wherein the membrane has a plurality of slits extending from a point inside the membrane to its circumference, the slits being arranged adjacent to the beams for increasing the beam length.

5. An infrared thermal sensor according to claim 4, wherein each beam is substantially linear, and being arranged between two parallel slits of the membrane, such that part of the beams is substantially surrounded by the membrane.

6. An infrared thermal sensor according to claim 4, wherein the beams are oriented such that different beams are substantially not co-linear.

7. An infrared thermal sensor according to claim 1, wherein
each beam comprises at least one thermocouple;
at least two of the beams have a different length;
each of the thermocouples have a substantially same constant width to length ratio.

8. An infrared thermal sensor according to claim 1, wherein the filling factor of the membrane in the cavity is less than 50%.

9. An infrared thermal sensor according to claim 1, wherein the pressure in the cavity is in the range of 500 Pa to 20 kPa.

10. An infrared thermal sensor according to claim 1, wherein the beams form a straight connection between a side of the cavity and the membrane, and whereby beams positioned at opposite sides of the membrane are not oriented co-linear.

11. An infrared thermal sensor according to claim 1, wherein the membrane is substantially circular in cross section in a plane parallel with the substrate.

12. An infrared thermal sensor according claim 1, wherein the arrangement of the membrane and the beams and the thermocouples is symmetric or rotation symmetric.

13. A method of designing an infrared thermal sensor, the method comprising:
a) defining an infrared thermal sensor comprising a substrate and a cap structure together forming a sealed cavity, a membrane arranged in the cavity for receiving infrared radiation through a window or aperture;
b) determining a number and geometry of beams to be arranged between the substrate and the membrane for suspending the membrane, and determining a number and geometry of thermocouples to be arranged on said beams for measuring a temperature difference between the membrane and the substrate, in such a way that the ratio of the thermal resistance between the membrane and the substrate through the thermocouples, and the thermal resistance between the membrane and the substrate through the beams and through the gas composition is a value in the range of 0.8 to 1.2, wherein a numerator of the ratio comprises the thermal resistance between the membrane and the substrate through the thermocouples, and a denominator of the ratio comprises the thermal resistance between the membrane and the substrate through the beams and through the gas composition.

14. A method according to claim 13, wherein said determining a number and geometry of the beams and number and geometry of thermocouples comprises:
choosing and/or varying one or more of the number and/or geometry of the beams and/or thermocouples;
determining an effect of the variation on the ratio, and determining based thereon a selection of the number and/or geometry of the beams and/or thermocouples to be used in the design.

15. A method according to claim 13, the method furthermore comprising producing an infrared thermal sensor in agreement with the determined number and geometry of the beams and thermocouples.

16. An infrared thermal sensor for detecting infrared radiation, the infrared thermal sensor comprising:
a substrate and a cap structure together forming a sealed cavity, the cavity comprising a gas composition at a predefined pressure;
a membrane arranged in said cavity for receiving infrared radiation through a window or aperture;
a plurality of beams for suspending the membrane;
a plurality of thermocouples arranged on said plurality of beams for measuring a temperature difference between the membrane and the substrate due to incident infrared radiation, wherein the beams are arranged such that part of the beams is substantially surrounded by the membrane;
wherein at least one of the plurality of beams is at least partially separated from the membrane by slits in the membrane.

17. An infrared thermal sensor according to claim 16, wherein the membrane has a plurality of slits extending from a point inside the membrane to its circumference, the slits being arranged adjacent to the beams for locally separating the beams from the membrane thus increasing the beam length.

18. An infrared thermal sensor according to claim 17, wherein for each beam, the slits locally separating the beam are parallel.

* * * * *